(12) United States Patent
Kimura

(10) Patent No.: US 10,949,143 B2
(45) Date of Patent: Mar. 16, 2021

(54) COMMUNICATION APPARATUS, COMMUNICATION SYSTEM, AND INFORMATION PROCESSING METHOD

(71) Applicant: CANON KABUSHIKI KAISHA, Tokyo (JP)

(72) Inventor: Tomohiro Kimura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 16/249,776

(22) Filed: Jan. 16, 2019

(65) Prior Publication Data

US 2019/0227757 A1 Jul. 25, 2019

(30) Foreign Application Priority Data

Jan. 23, 2018 (JP) .............................. JP2018-008665

(51) Int. Cl.

| | |
|---|---|
| *G06F 3/12* | (2006.01) |
| *H04W 8/00* | (2009.01) |
| *H04W 28/00* | (2009.01) |
| *H04W 88/02* | (2009.01) |
| *H04W 88/08* | (2009.01) |
| *H04N 1/00* | (2006.01) |
| *H04W 84/12* | (2009.01) |

(52) U.S. Cl.
CPC .......... *G06F 3/1231* (2013.01); *G06F 3/1204* (2013.01); *G06F 3/1236* (2013.01); *H04N 1/00411* (2013.01); *G06F 3/1286* (2013.01); *G06F 3/1292* (2013.01); *H04W 84/12* (2013.01)

(58) Field of Classification Search
USPC ................ 358/1.1–3.29, 1.11–1.18, 426.08; 709/201–251; 715/734–753, 853–860; 726/1–30
See application file for complete search history.

(56) References Cited

U.S. PATENT DOCUMENTS

| | | | |
|---|---|---|---|
| 10,359,978 B2 * | 7/2019 | Narita | G06F 3/1236 |
| 2012/0127523 A1 * | 5/2012 | Terashita | G06F 3/1285 |
| | | | 358/1.15 |

(Continued)

FOREIGN PATENT DOCUMENTS

| | | |
|---|---|---|
| JP | 2010-98765 A | 4/2010 |
| JP | 2013-153533 A | 8/2013 |

*Primary Examiner* — Marcellus J Augustin
(74) *Attorney, Agent, or Firm* — Canon U.S.A., Inc. IP Division

(57) ABSTRACT

A communication apparatus includes a first determination unit that, in a case where a use request for a wireless local area network (LAN) setting service has been received, determines whether a communication in a wireless LAN infrastructure mode is in execution, a transmission unit that, in a case where it is determined that a communication in the wireless LAN infrastructure mode is in execution, transmits information indicating that the wireless LAN setting service is unavailable to a terminal apparatus, and, in a case where it is determined that no communication in the wireless LAN infrastructure mode is in execution, transmits information indicating that the wireless LAN setting service is available to the terminal apparatus, and an activation unit that, in a case where it is determined that no communication in the wireless LAN infrastructure mode is in execution, activates the wireless LAN setting service.

18 Claims, 8 Drawing Sheets

(56) References Cited

U.S. PATENT DOCUMENTS

| | | | |
|---|---|---|---|
| 2014/0268223 A1* | 9/2014 | Kimura | G06F 3/1236 358/1.15 |
| 2015/0382136 A1* | 12/2015 | Mihira | H04W 12/0608 455/41.1 |
| 2017/0339736 A1* | 11/2017 | Suga | H04N 1/00307 |
| 2017/0344318 A1* | 11/2017 | Kawasaki | G06F 3/1204 |
| 2019/0075442 A1* | 3/2019 | Suzuki | H04W 4/80 |

* cited by examiner

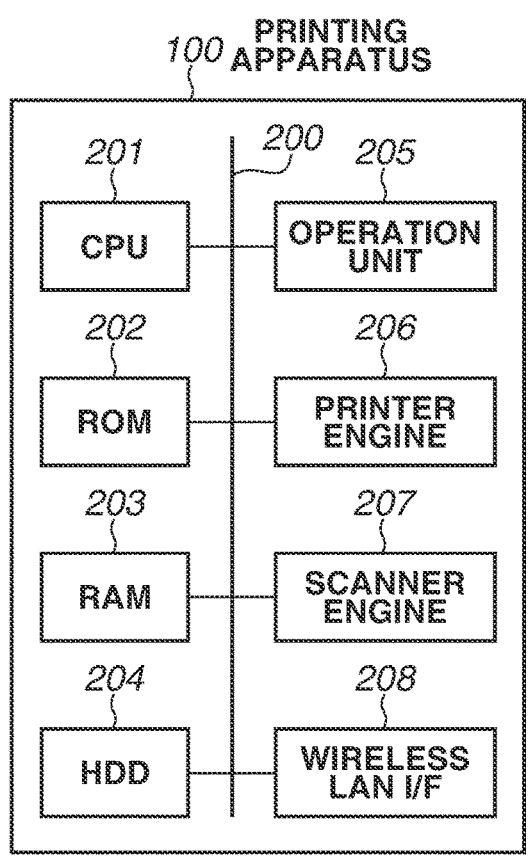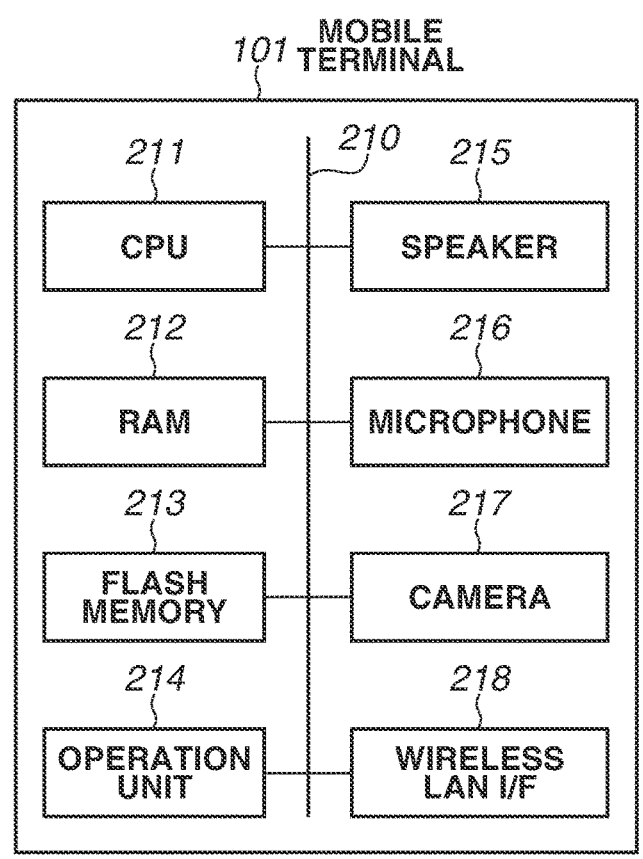

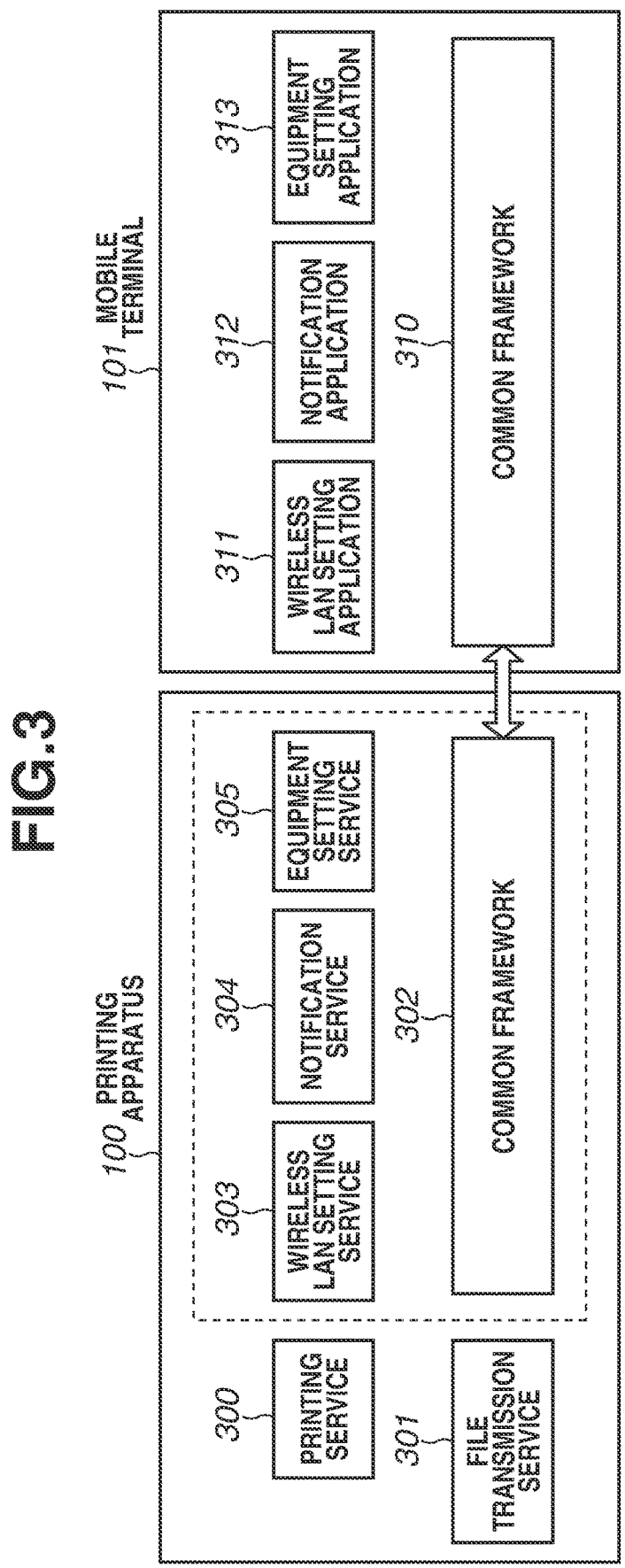

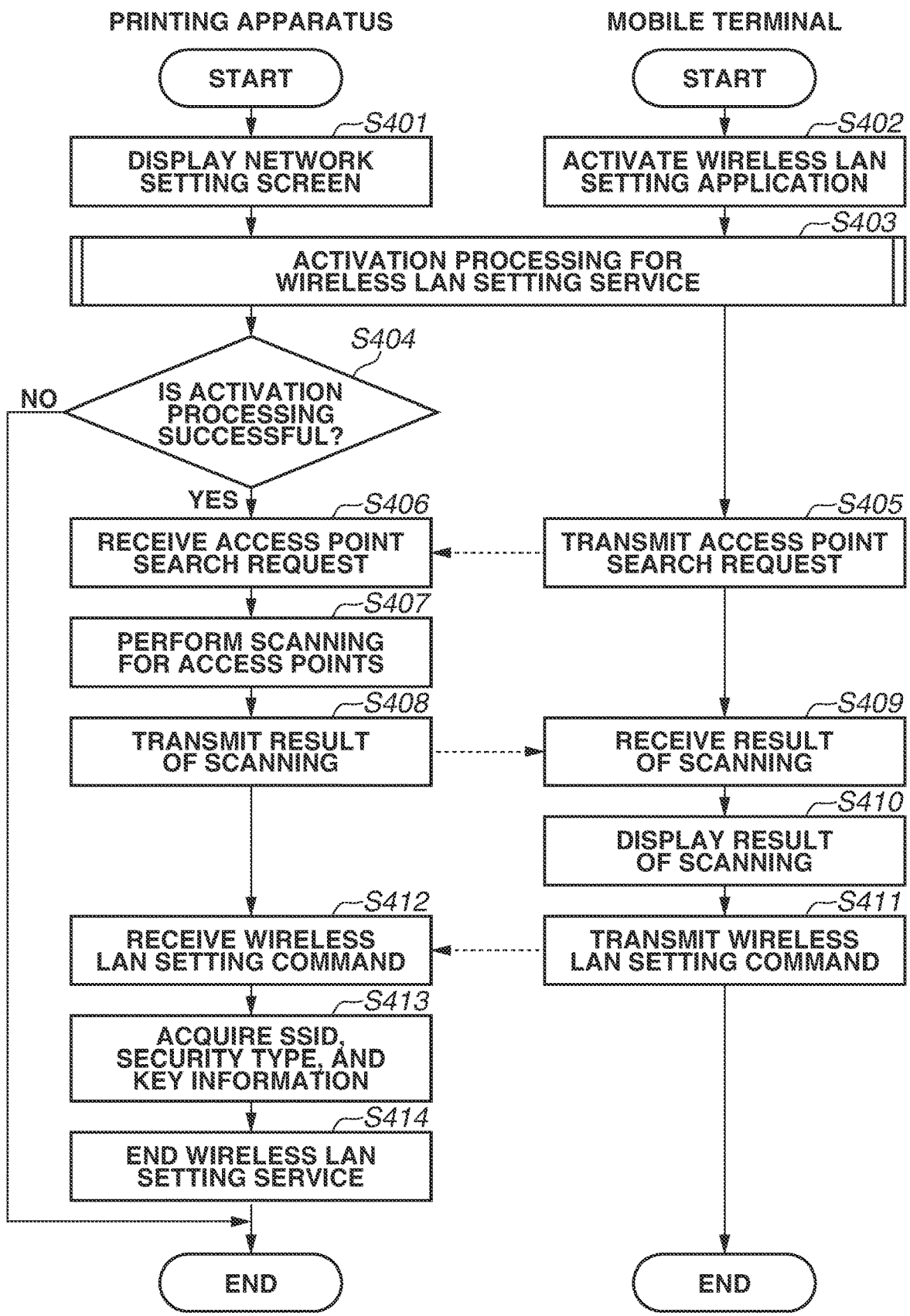

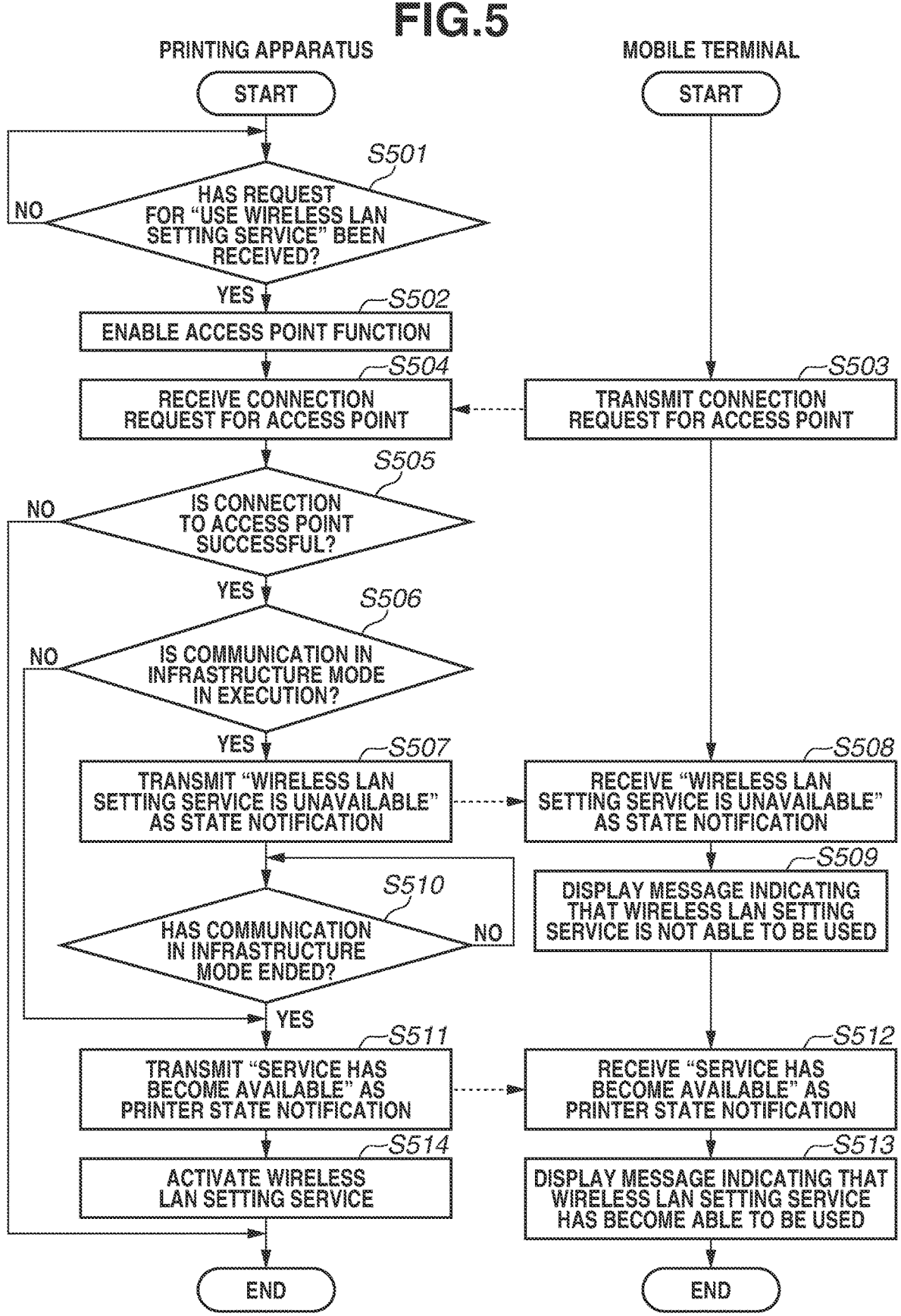

COMMUNICATION APPARATUS, COMMUNICATION SYSTEM, AND INFORMATION PROCESSING METHOD

BACKGROUND

Field

Aspects of the present disclosure generally relate to a communication apparatus, a communication system, and an information processing method.

Description of the Related Art

There is a conventional system that enables an information processing apparatus or mobile terminal equipped with a wireless interface to connect to a network via a wireless access point and operates the information processing apparatus via the network or acquires information from the information processing apparatus. In such a system, in order to enable easily setting a wireless local area network (LAN) used for newly connecting the information processing apparatus to a network, there have been proposed methods of setting information about a wireless access point to the information processing apparatus using a mobile terminal, as discussed in Japanese Patent Application Laid-Open No. 2010-98765 and Japanese Patent Application Laid-Open No. 2013-153533. The method discussed in Japanese Patent Application Laid-Open No. 2010-98765 connects a mobile terminal and an information processing apparatus to each other by a wired interface and transmits network setting information (service set identifier (SSID) or key information) for connecting to a wireless access point from the mobile terminal to the information processing apparatus. Then, the information processing apparatus accesses the wireless access point based on the acquired network setting information, thus completing participation in the network. After the information processing apparatus completes participation in the network, the mobile terminal and the information processing apparatus perform communication via a wireless LAN, so that a user can operate the mobile terminal to control the information processing apparatus and acquire information therefrom. The method discussed in Japanese Patent Application Laid-Open No. 2013-153533 connects an information processing apparatus and a mobile terminal to each other by wireless communication and transmits network setting information for connecting to a wireless access point from the mobile terminal to the information processing apparatus.

However, if the information processing apparatus suddenly changes setting information concerning a wireless access point to which the information processing apparatus is to connect, there is a possibility that a communication that has been performed via the wireless access point can be cut off without being completed.

SUMMARY

According to an aspect of the present invention, a communication apparatus includes a first determination unit configured to, in a case where a use request for a wireless local area network (LAN) setting service has been received, determine whether a communication in a wireless LAN infrastructure mode is in execution, a transmission unit configured to, in a case where it is determined that a communication in the wireless LAN infrastructure mode is in execution, transmit information indicating that the wireless LAN setting service is unavailable to a terminal apparatus, and configured to, in a case where it is determined that no communication in the wireless LAN infrastructure mode is in execution, transmit information indicating that the wireless LAN setting service is available to the terminal apparatus, and an activation unit configured to, in a case where it is determined that no communication in the wireless LAN infrastructure mode is in execution, activate the wireless LAN setting service.

Further features will become apparent from the following description of exemplary embodiments with reference to the attached drawings.

BRIEF DESCRIPTION OF THE DRAWINGS

FIGS. 2A and 2B are diagrams each illustrating an example of a hardware configuration.

FIG. 3 is a diagram illustrating an example of a software architecture configuration.

FIG. 4 is a flowchart illustrating an example of basic information processing.

FIG. 5 is a flowchart illustrating an example of activation processing for a wireless local area network (LAN) setting service.

DESCRIPTION OF THE EMBODIMENTS

Various exemplary embodiments, features, and aspects will be described in detail below with reference to the drawings.

<System Configuration>

Figure 1:
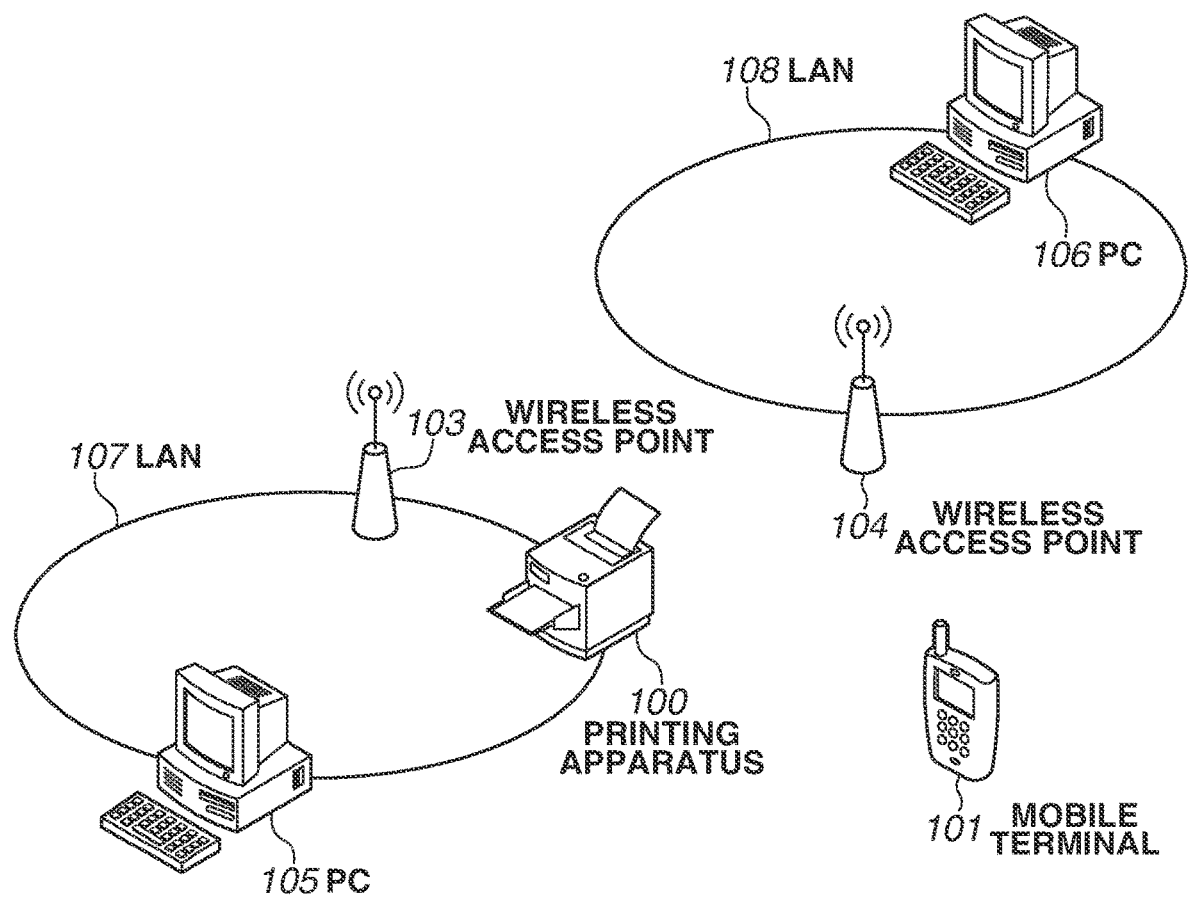
FIG. 1 is a diagram illustrating an example of a system configuration of a communication system.

FIG. 1 is a diagram illustrating an example of a system configuration of a communication system according to a first exemplary embodiment. In an environment in the first exemplary embodiment, there exist a plurality of network devices and a mobile terminal. For example, in FIG. 1, a printing apparatus 100 is connected to a local area network (LAN) 107 via a wireless access point 103 and is can communicate with a personal computer (PC) 105 on the same LAN 107, such as receiving a printing instruction from the PC 105.

There is a LAN 108 as another LAN environment, and, on the LAN 108, there exist a wireless access point 104 and a PC 106.

Additionally, as a portable terminal, there exists a mobile terminal 101, which can perform ad hoc connection with the printing apparatus 100 using a wireless access point function included in the printing apparatus 100.

<Hardware Configurations>

Hardware configurations are described with reference to FIGS. 2A and 2B.

<Hardware Configuration of Printing Apparatus 100>

Various hardware components 201 to 208 of the printing apparatus 100 are interconnected via an internal bus 200 and can exchange data with each other. A central processing unit (CPU) 201 controls operations of the entire printing apparatus 100. The CPU 201 reads out a program stored in a read-only memory (ROM) 202 to perform various control operations, such as a printing control operation. A random access memory (RAM) 203 is a volatile memory that the CPU 201 uses as a work area to execute various programs. A hard disk drive (HDD) 204 stores image data and various programs. An operation unit 205 is equipped with a display, which operates as a touch panel that is operable by, for example, a user's finger. A printer engine 206 prints image data transferred via the internal bus 200 on a sheet of paper. A scanner engine 207 stores read image data in the HDD 204 or transmits read image data onto the LAN 107 via a wireless LAN interface (I/F) 208. The wireless LAN I/F 208, which is connected to the wireless access point 103, is a wireless-compatible network interface card (NIC) that can perform network communication. The wireless LAN I/F 208 has a function to connect to a wireless LAN using a method compliant with, for example, the standard of Institute of Electrical and Electronics Engineers (IEEE) 802.11b, 802.112, and 802.11n. In response to an instruction from the CPU 201, the wireless LAN I/F 208 can operate with a software access point mode (hereinafter referred to as an "access point mode") and an infrastructure mode.

In the access point mode, the printing apparatus 100 itself operates as a wireless access point and can thus communicate with another wireless LAN-equipped device (for example, the mobile terminal 101). In the infrastructure mode, the printing apparatus 100 operates as a wireless terminal and, when connecting to a wireless access point, such as the wireless access point 103, can connect to a network. The access point mode and the infrastructure mode are not exclusive of each other and can operate at the same time.

The CPU 201 performs processing based on a program stored in the ROM 202 or the HDD 204, thus implementing a software architecture configuration of the printing apparatus 100 illustrated in FIG. 3 and information processing performed by the printing apparatus 100 illustrated in flowcharts of FIG. 4 and FIG. 5.

<Hardware Configuration of Mobile Terminal 101>

Various hardware components 211 to 218 of the mobile terminal 101 are interconnected via an internal bus 210 and are able to exchange data with each other. A CPU 211 controls operations of the entire mobile terminal 101. A RAM 212 is a volatile memory that the CPU 211 uses as a work area to execute various programs. A flash memory 213 is a non-volatile memory that stores various programs and data. An operation unit 214 is equipped with a display, which operates as a touch panel that, for example, is operable by a user's finger. A speaker 215 is a device that converts an electronic signal of sound into sound. A microphone 216 detects sound and converts the detected sound into an electronic signal. A camera 217 captures a still image or moving image and converts the captured image into electronic data. A wireless LAN I/F 218 is a wireless-compatible NIC that can connect to the wireless access point 103 or the printing apparatus 100 operating with the access point mode to perform network communication.

The CPU 211 performs processing based on a program stored in the flash memory 213, thus implementing a software architecture configuration of the mobile terminal 101 illustrated in FIG. 3 and information processing performed by the mobile terminal 101 illustrated in the flowcharts of FIG. 4 and FIG. 5.

<Software Architecture Configurations>

The software architecture configurations are described with reference to FIG. 3.

The printing apparatus 100 and the mobile terminal 101 operate on common frameworks 302 and 310, which regulate a communication protocol for performing communication via the wireless LAN I/F 208 and the wireless LAN I/F 218, and perform communication with each other in peer-to-peer fashion based on the specifications of the frameworks. The common framework can be a framework specific to the manufacturer of the device or can be a framework that is defined by the standard specification and is not dependent on manufacturers. The standard specification includes, for example, AllJoyn®.

The mobile terminal 101 has applications that operate based on the common framework 310 installed thereon, and can perform, for example, operations of various devices via the applications. On the mobile terminal 101, there are installed a wireless LAN setting application 311, which is used to perform a wireless LAN setting of the printing apparatus 100, and a notification application 312, which is used to issue a notification of information about, for example, the status of a device. On the mobile terminal 101, there is installed an equipment setting application 313, which is used to perform setting of equipment information about, for example, an installation location. In the first exemplary embodiment, the mobile terminal 101 is configured to have a plurality of applications installed thereon, but can be configured to have a single application installed thereon.

The printing apparatus 100 is also equipped with the common framework 302 and is equipped with a wireless LAN setting service 303, a notification service 304, and an equipment setting service 305 as services corresponding to the respective applications 311 to 313 of the mobile terminal 101. The printing apparatus 100 also includes, a printing service 300 for performing printing and a file transmission service 301 for transmitting a data file acquired from, for example, a scanner.

The printing apparatus 100 advertises a service owned by the printing apparatus 100 onto a network via the common frameworks. This enables an application of the mobile terminal 101 to perform a search (discovery) for what service the printing apparatus 100 owns. For example, when the equipment setting application 313 of the mobile terminal 101 is activated, the equipment setting application 313 starts a search for an equipment setting service (for example, the equipment setting service 305) on the network. When the equipment setting service 305 of the printing apparatus 100 is detected, the mobile terminal 101 performs communication with the printing apparatus 100 via the common framework 302 and the common framework 310, so that the mobile terminal 101 can use the equipment setting service 305 of the printing apparatus 100.

Processing of each service or each framework of the printing apparatus 100 is performed by the CPU 201, and processing of each application or the common framework of the mobile terminal 101 is performed by the CPU 211. While the common frameworks that operate via the wireless LAN I/F 208 and the wireless LAN FF 218 have been described, another communication method, such as near-field communication (NFC) or Bluetooth®, can be employed.

The wireless LAN setting service 303, which is included in the printing apparatus 100, is described. When the wireless LAN setting service 303 is used, setting of a wireless LAN of the printing apparatus 100 can be performed via a network, thus enabling the printing apparatus 100 to participate in the wireless LAN. This is also called an "onboarding service". The printing apparatus 100, when operating as the wireless LAN setting service 303, receives an access point search request command and a wireless LAN setting command from the mobile terminal 101. The access point search request command is a command to request scanning of access points situated around the printing apparatus 100 and acquire a result of the scanning. The wireless LAN setting command is a command to perform the wireless LAN setting of the printing apparatus 100. In the first exemplary embodiment, a method of using the wireless LAN setting service 303 to cause the printing apparatus 100, which is connected to the wireless access point 103 and situated on the LAN 107, to connect to the wireless access point 104 and participate in the LAN 108 is described.

<Basic Flow in First Exemplary Embodiment>

A basic operation for reconnecting the printing apparatus 100 from the wireless access point 103 to the wireless access point 104 in the first exemplary embodiment is described with reference to the flowchart of FIG. 4. Unless otherwise stated, the main element of the printing apparatus 100 is the CPU 201 of the printing apparatus 100, and the main element of the mobile terminal 101 is the CPU 211 of the mobile terminal 101.

Figure 6A:
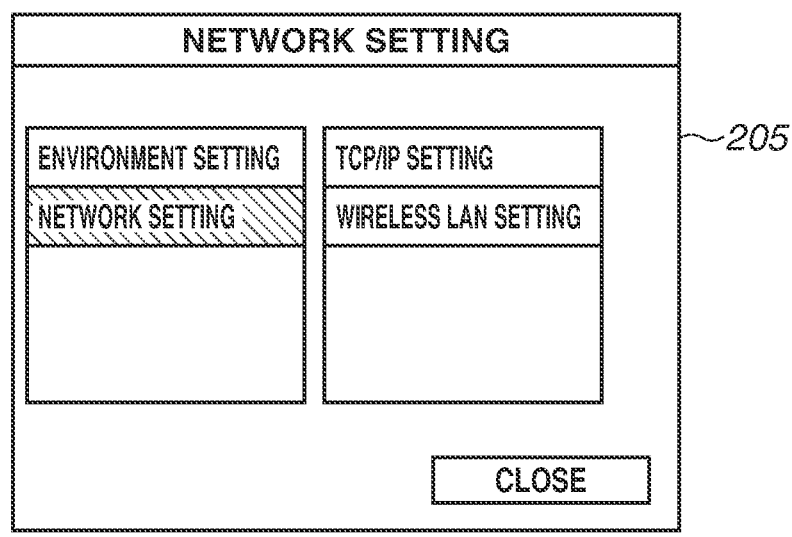
FIGS. 6A, 6B, and 6C are diagrams each illustrating an example of a screen displayed on a printing apparatus.
Figure 6B:
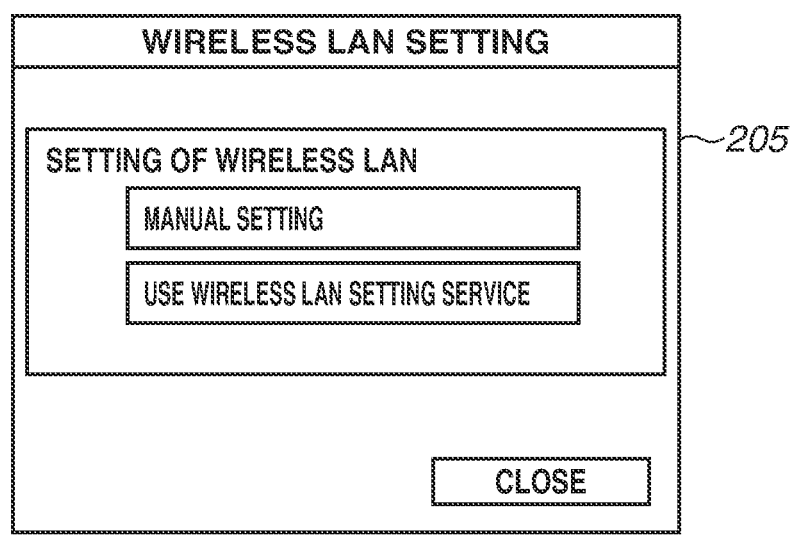

In step S401, upon receiving an instruction from the user via the operation unit 205, the printing apparatus 100 displays a screen for a network setting on the operation unit 205, as illustrated in FIG. 6A. In the network setting screen illustrated in FIG. 6A, the user selects the "network setting" and then selects the "wireless LAN setting". Upon receiving selection by the user via the operation unit 205, the printing apparatus 100 displays a screen for the wireless LAN setting on the operation unit 205, as illustrated in FIG. 6B. Here, prior to displaying the network setting screen illustrated in FIG. 6A, the printing apparatus 100 can perform authentication of the user by receiving a user name and a password via the operation unit 205, thus limiting displaying of the network setting screen to a user having the authority to perform network setting.

In step S402, the mobile terminal 101 activates the wireless LAN setting application 311.

When the printing apparatus 100 and the mobile terminal 101 have become ready to use the wireless LAN setting service 303, in step S403, the printing apparatus 100 and the mobile terminal 101 perform activation processing for the wireless LAN setting service 303. In step S403, while details of which are described below with reference to FIG. 5, the access point mode of the printing apparatus 100 is activated and processing for causing the mobile terminal 101 to wirelessly connect to the printing apparatus 100 is performed.

In step S404, the printing apparatus 100 determines whether the activation processing is successful. In a case where it is determined that the activation processing is successful (YES in step S404), the printing apparatus 100 advances the processing to step S406, and, if it is determined that the activation processing failed (NO in step S404), the printing apparatus 100 ends the processing of the printing apparatus 100 illustrated in FIG. 4.

In step S405, the mobile terminal 101 transmits a search request command for access points to the printing apparatus 100.

In step S406, the printing apparatus 100 receives the access point search request command from the mobile terminal 101 via the wireless LAN I/F 208.

In step S407, the printing apparatus 100 performs scanning of beacon information transmitted from neighboring access points using the wireless LAN I/F 208. As a result of the scanning, the printing apparatus 100 acquires a service set identifier (SSID) and the security type of an access point to which the printing apparatus 100 can connect. The security type refers to an encryption method or authentication method for wireless communication.

In step S408, the printing apparatus 100 transmits a list of access points found as a result of search to the mobile terminal 101.

In step S409, the mobile terminal 101 receives the list of access points from the printing apparatus 100.

In step S410, the mobile terminal 101 displays the list of access points on the operation unit 214. The user, who operates the mobile terminal 101, selects an access point to which the user wants to perform connection from among the list. In the first exemplary embodiment, the SSID of the wireless access point 104 is assumed to be selected. In a case where setting of encryption is performed on the selected access point, the mobile terminal 101 can prompt the user to further enter a network key, thus enabling dealing with even the encrypted access point.

Upon receiving an input from the user, in step S411, the mobile terminal 101 transmits a wireless LAN setting command to the printing apparatus 100. The wireless LAN setting command includes pieces of information about the SSID, key, and security type of the wireless access point 104.

In step S412, the printing apparatus 100 receives the wireless LAN setting command from the mobile terminal 101.

In step S413, the printing apparatus 100 acquires the pieces of information about the SSID, key, and security type included in the wireless LAN setting command. These pieces of information are used for the printing apparatus 100 to connect to the wireless access point 104.

Upon completion of such acquisition, in step S414, the printing apparatus 100 ends the wireless LAN setting service 303.

<Flow of Activation Processing for Wireless LAN Setting Service 303 in First Exemplary Embodiment>

Initialization processing for, at the time of using the wireless LAN setting service 303, activating the access point mode of the printing apparatus 100 and causing the mobile terminal 101 to be able to use the wireless LAN setting service 303 is described with reference to the flowchart of FIG. 5. Unless otherwise stated, the main element of the printing apparatus 100 is the CPU 201 of the printing apparatus 100, and the main element of the mobile terminal 101 is the CPU 211 of the mobile terminal 101.

Figure 6C:
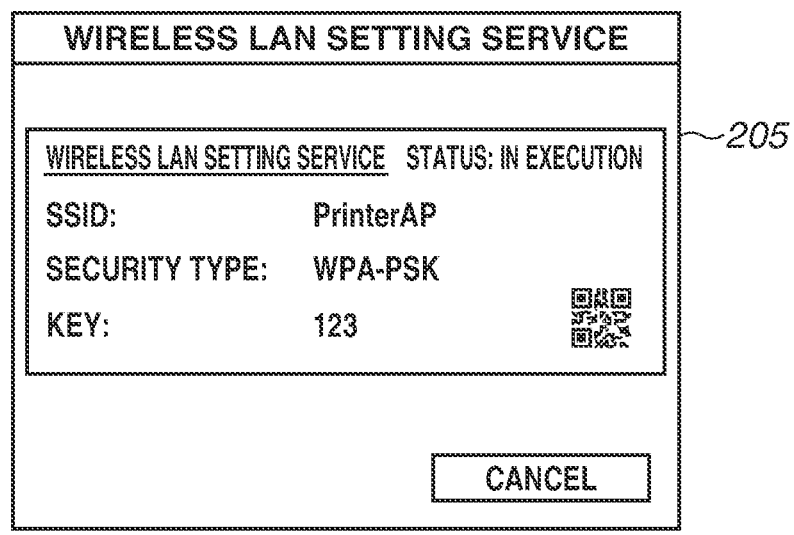

In step S501, the printing apparatus 100 determines whether a request for "Use Wireless LAN Setting Service" in the Wireless LAN Setting" illustrated in FIG. 6B has been received via the operation unit 205. The request for "Use Wireless LAN Setting Service" is an example of a use request for a wireless LAN setting service. In a case where it is determined that the request for "Use Wireless LAN Setting Service" has been received (YES in step S501), the printing apparatus 100 advances the processing to step S502, and, in a case where it is determined that the request for "Use Wireless LAN Setting Service" has not been received (NO in step S501), the printing apparatus 100 repeats the processing in step S501. In step S502, the printing apparatus 100 enables the access point mode of the wireless LAN I/F 208. In the first exemplary embodiment, in this instance, the SSID is assumed to be fixed to "PrinterAP" and the network key is assumed to be fixed to "123". The printing apparatus 100 displays the SSID and the key on the operation unit 205, as illustrated in FIG. 6C. Referring to FIG. 6C, the printing apparatus 100 also displays, on the operation unit 205, a barcode image including the SSID and the key thus enabling the mobile terminal 101 to easily acquire access point information about the printing apparatus 100 using the camera 217. The SSID and the key can be the ones the user previously set to the printing apparatus 100 or the ones the printing apparatus 100 automatically generated in a random manner Making the SSID and the key variable enables only a user who knows those to perform connection to the printing apparatus 100 and enables preventing an unexpected user from performing connection to the printing apparatus 100.

In step S503, the mobile terminal 101 transmits, to the printing apparatus 100, a connection request command to an access point including the SSID and the key displayed on the screen illustrated in FIG. 6C.

In step S504, the printing apparatus 100 receives the connection request command.

In step S505, the printing apparatus 100 determines whether connection of the printing apparatus 100 to the access point is successful, based on the SSID and the key included in the connection request command In a case where it is determined that connection of the printing apparatus 100 to the access point is successful (YES in step S505), the printing apparatus 100 completes the connection to the mobile terminal 101 via the access point mode and then advances the processing to step S506. In a case where it is determined that connection of the printing apparatus 100 to the access point is failed (NO in step S505), the printing apparatus 100 denies the connection and then ends the processing illustrated in the flowchart of FIG. 5.

In step S506, the printing apparatus 100 determines whether a communication in the wireless LAN infrastructure mode is in execution. In a case where the printing service 300 is receiving a printing command via the wireless access point 103, the printing apparatus 100 determines that a communication in the wireless LAN infrastructure mode is in execution. In a case where the file transmission service 301 is performing transfer processing of file data, the printing apparatus 100 determines that a communication in the wireless LAN infrastructure mode is in execution. However, determination whether a communication in the wireless LAN infrastructure mode is in execution is not limited to these examples. For example, after the completion of receipt of print data, the printing apparatus 100 can determine that no communication in the wireless LAN infrastructure mode is in execution. In other words, during the process of receiving print data, the printing apparatus 100 can determine that a communication in the wireless LAN infrastructure mode is in execution. After the completion of discharging of a printed product, the printing apparatus 100 can determine that no communication in the wireless LAN infrastructure mode is in execution. In other words, during a period from the time of receipt of print data to the time of discharging of a printed product, the printing apparatus 100 can determine that a communication in the wireless LAN infrastructure mode is in execution. In a case where it is determined that a communication in the wireless LAN infrastructure mode is in execution (YES in step S506), the printing apparatus 100 advances the processing to step S507, and, in a case where it is determined that no communication in the wireless LAN infrastructure mode is in execution (NO in step S506), the printing apparatus 100 advances the processing to step S511.

In step S507, the printing apparatus 100 transmits, to the mobile terminal 101, a message indicating that the wireless LAN setting service 303 is in an unavailable state using a notification command issued by the notification service 304. The message indicating that the wireless LAN setting service 303 is in an unavailable state is an example of information indicating that the wireless LAN setting service 303 is unavailable.

In step S508, the mobile terminal 101 receives, with the notification command, the message indicating that the wireless LAN setting service 303 is in an unavailable state.

Figure 7A:
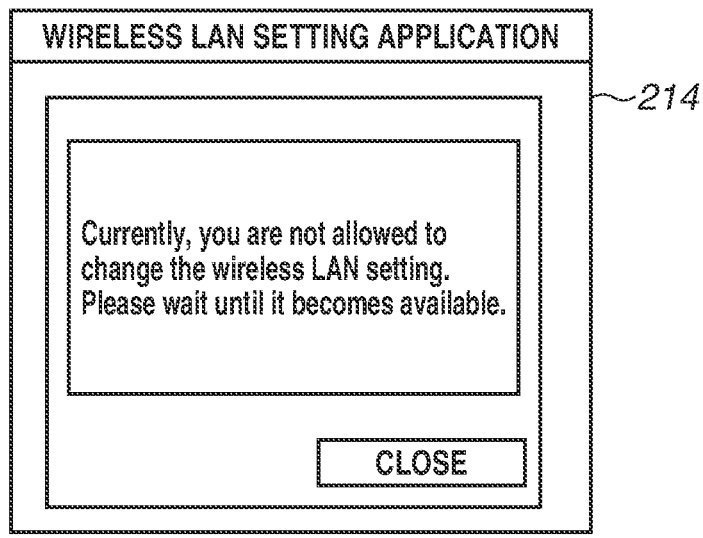
FIGS. 7A, 7B, 7C, 7D, 7E, and 7F are diagrams each illustrating an example of a screen displayed on a mobile terminal.
Figure 7B:
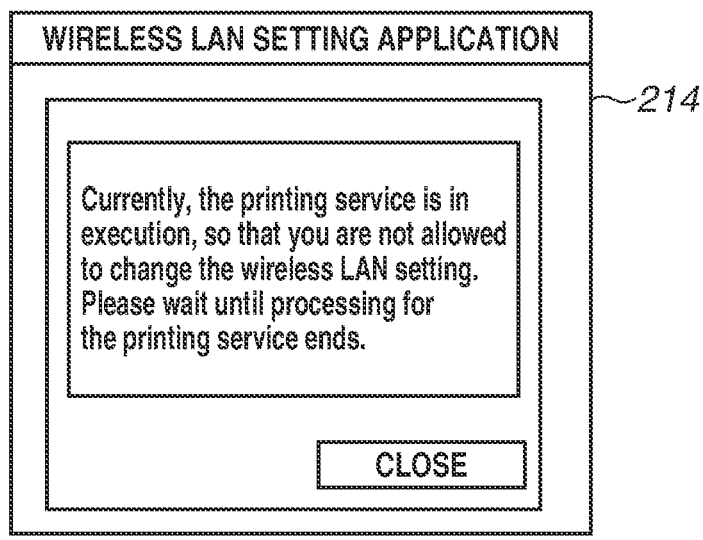
Figure 7C:
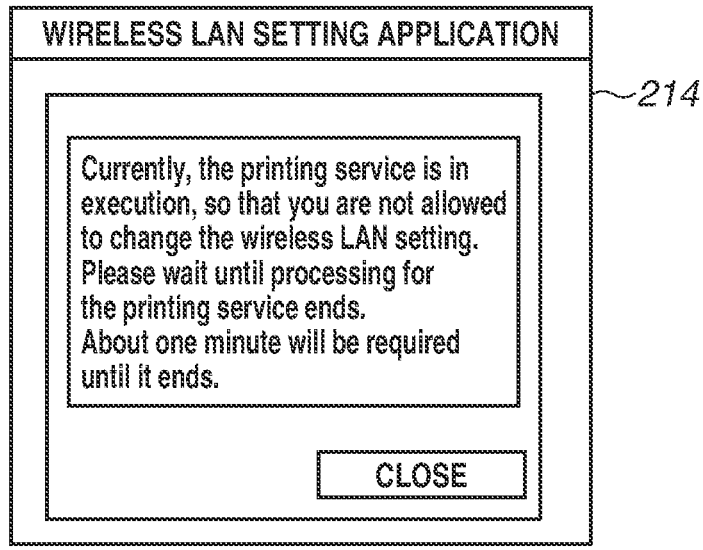

In step S509, the mobile terminal 101 displays, via the notification application 312, a message indicating that the wireless LAN setting service 303 cannot currently be used on the operation unit 214, as illustrated in FIG. 7A. In processing in steps S507 to S509, the printing apparatus 100 and the mobile terminal 101 can issue and display a notification of accompanying information such as a cause why the wireless LAN setting service 303 cannot be used, as illustrated in FIG. 7B. The printing apparatus 100 and the mobile terminal 101 can issue and display a notification of additional information such as the prediction of a time required until the wireless LAN setting service 303 can be used, as illustrated in FIG. 7C.

In step S510, the printing apparatus 100 performs monitoring until the communication in the infrastructure mode ends. At that time, the printing apparatus 100 can enter a state of not accepting new connection to the printing service 300 and the file transmission service 301. In a case where it is determined that the communication in the infrastructure mode has ended (YES in step S510), the printing apparatus 100 advances the processing to step S511, and, in a case where it is determined that the communication in the infrastructure mode has not ended (NO in step S510), the printing apparatus 100 repeats processing in step S510. In step S511, the printing apparatus 100 transmits, to the mobile terminal 101, a message indicating that the wireless LAN setting service 303 has become available using a notification command issued by the notification service 304.

In step S512, the mobile terminal 101 receives, with the notification command, the message indicating that the wireless LAN setting service 303 has become available.

Figure 7D:
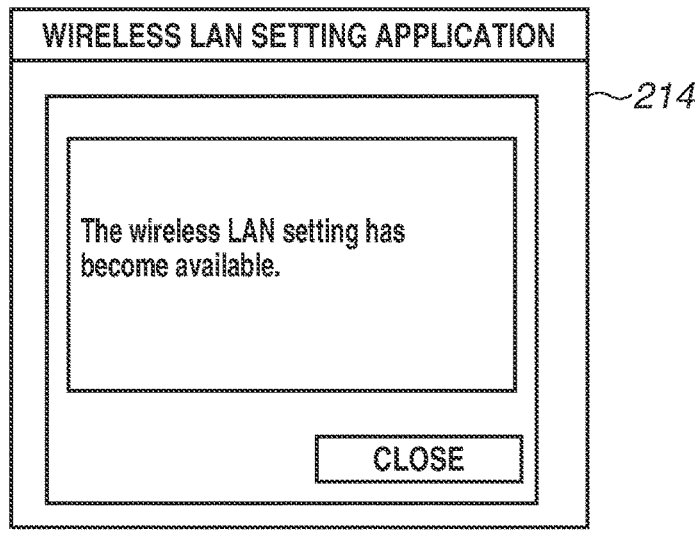

In step S513, the mobile terminal 101 displays, via the notification application 312, a message indicating that the wireless LAN setting service 303 has currently become available on the operation unit 214, as illustrated in FIG. 7D.

Additionally, in step S514, the printing apparatus 100 starts the wireless LAN setting service 303 and advertises a service onto the network using the common frameworks. Advertising the wireless LAN setting service 303 enables the mobile terminal 101 to refer to the wireless LAN setting service 303 as a service provided by the printing apparatus 100.

Advantageous Effect in First Exemplary Embodiment

As described above, according to the first exemplary embodiment, in the case of performing the wireless LAN setting for equipment via a network, only when no communication is being performed via a wireless LAN, a wireless LAN setting service is enabled. This enables solving an issue where a communication that has been connected via a wireless access point is cut off without being completed.

In the first exemplary embodiment, in steps S510 to S514 illustrated in FIG. 5, after waiting for the completion of a communication in the infrastructure mode, the printing apparatus 100 activates the wireless LAN setting service 303. In a second exemplary embodiment, a method of activating the wireless LAN setting service 303 in response to a user's selection is described.

Figure 7E:
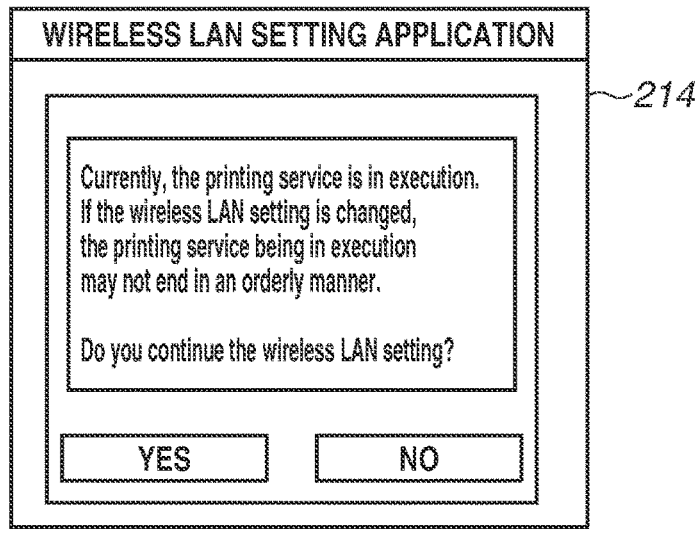

In step S509 illustrated in FIG. 5, the mobile terminal 101 displays a selection item for activating a wireless LAN setting service on the operation unit 214 while indicating that a communication in the infrastructure mode can be cut off when the printing apparatus 100 is performing communication in the infrastructure mode, as illustrated in FIG. 7E. Referring to FIG. 7E, in a case where "YES" has been selected, the mobile terminal 101 transmits, to the printing apparatus 100, a command for notification indicating activating the wireless LAN setting service 303 using the common framework 310. Upon receiving the command for notification indicating activating the wireless LAN setting service 303, in step S514, the printing apparatus 100 performs activation of the wireless LAN setting service 303.

In the case of activating the wireless LAN setting service 303 of the printing apparatus 100, a method of cutting off a communication that is currently in execution can be employed.

Figure 7F:
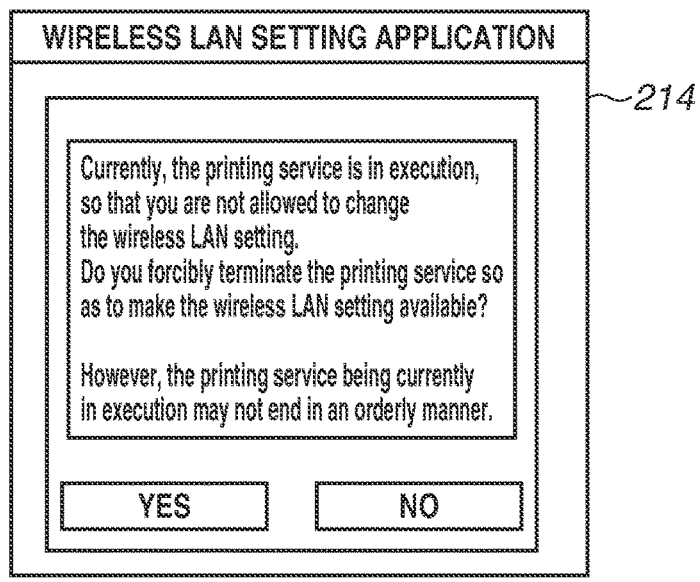

In step S509 illustrated in FIG. 5, the mobile terminal 101 displays a selection item for cutting off a communication that is currently in execution on the operation unit 214, as illustrated in FIG. 7F. Referring to FIG. 7F, in a case where "YES" has been selected, the mobile terminal 101 transmits, to the printing apparatus 100, a command for notification indicating cutting off a communication that is currently in execution and activating the wireless LAN setting service 303 using the common framework 310. Upon receiving the command for notification indicating cutting off a communication that is currently in execution and activating the wireless LAN setting service 303, the printing apparatus 100 cuts off a communication that is currently in execution and performs activation of the wireless LAN setting service 303.

Advantageous Effect in Second Exemplary Embodiment

As described above, according to the second exemplary embodiment, the wireless LAN setting can be changed irrespective of the state of the infrastructure mode of the printing apparatus 100, so that, for example, a user with an administrator authority can force performance of the wireless LAN setting.

In the first exemplary embodiment, in step S514 illustrated in FIG. 5, the printing apparatus 100 activates the wireless LAN setting service 303, but a new communication in the infrastructure mode can be started before the wireless LAN setting is performed. In a third exemplary embodiment, a method in which the printing apparatus 100 does not start a new communication in the infrastructure mode before the wireless LAN setting is performed is described. In step S514 illustrated in FIG. 5, before activating the wireless LAN setting service 303, the printing apparatus 100 causes the printing service 300 or the file transmission service 301 to deny connection in an application layer. With this, before activating the wireless LAN setting service 303, the printing apparatus 100 does not receive a new connection from communications in the wireless LAN infrastructure mode. As another method, the printing apparatus 100 can cut off a communication with a wireless access point that is being connected in the infrastructure mode.

To notify the user that various services 300 and 301 are not available, the printing apparatus 100 transmits, to the mobile terminal 101, a notification command indicating that the various services cannot be used via the infrastructure mode. Then, the mobile terminal 101, upon receipt of the notification command, can display, on the operation unit 214, information indicating that the various services cannot be used via the infrastructure mode.

The various services in this case are not limited to the printing service 300 and the file transmission service 301, but can be other services included in the printing apparatus 100.

The processing performed in the third exemplary embodiment is an example of processing for denying connection of a new communication in the wireless LAN infrastructure mode before activation of the wireless LAN setting service 303.

Advantageous Effect in Third Exemplary Embodiment

As described above, according to the third exemplary embodiment, the printing apparatus 100 does not start a new communication in the infrastructure mode before the wireless LAN setting is performed, so an issue that the printing apparatus 100 can restart a communication in the infrastructure mode to cause an issue described in the first exemplary embodiment to reoccur can be prevented.

According to the above-described exemplary embodiments, an issue that a communication that has been connected via a wireless access point can be cut off without being completed can be prevented.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-008665, filed Jan. 23, 2018, which is hereby incorporated by reference herein in its entirety.

What is claimed is:

1. A communication apparatus having a first communication function and a second communication function, the first communication function being a function of causing the communication apparatus to serve as a wireless client that is connected to an external access point and performs communication via the external access point, the second communication function being a function of performing direct wireless communication with an external apparatus, the communication apparatus comprising:
at least one memory that stores a set of instructions; and
at least one processor that executes the instructions, the instructions, when executed, causing the communication apparatus to perform operations comprising:
performing a first determination to, in a case where a use request for using a setting service of externally receiving a setting change regarding the wireless client has been received, determine whether a predetermined type of data communication is being performed using the first communication function or not;
after determining that the predetermined type of the data communication is being performed using the first communication function, transmitting, to the external apparatus with which the direct wireless communication has been established, first information that indicates that the setting service is temporarily unavailable;
after determining that the predetermined type of the data communication is not being performed using the first communication function, transmitting, to the external apparatus with which the direct wireless communication has been established, second information that indicates that the setting service is available; and
activating the setting service in a case where third information indicating activating the setting service is received from the external apparatus after transmitting the first information to the external apparatus,
wherein the activated setting service receives connection information from the external apparatus via the direct wireless communication, and the received connection information is used for changing the external access point to which the wireless client is connected.

2. The communication apparatus according to claim 1, wherein the operations further comprising:
determining whether the predetermined type of the data communication has ended, after determining that the predetermined type of the data communication is being performed using the first communication function; and
transmitting, in a case where it is determined the predetermined type of the data communication has ended, the second information to the external apparatus with which the direct wireless communication has been established.

3. The communication apparatus according to claim 2, wherein, the operations further comprising:
activating the setting service, in a case where it is determined that predetermined type of the data communication is being performed; and
stopping the setting service, after receiving the connection information.

4. The communication apparatus according to claim 1, wherein the third information contains information for triggering a disconnection operation of forcibly disconnecting communication regarding the first communication function.

5. The communication apparatus according to claim 1, wherein the operations further comprising:
changing a setting regarding the first communication function so as to avoid a new connection using the first communication function from being performed, before activation of the setting service.

6. The communication apparatus according to claim 1, wherein the use request is received via a screen displayed on an operation unit.

7. The communication apparatus according to claim 1, wherein the communication apparatus is a printing apparatus.

8. The communication apparatus according to claim 1, wherein the second communication function is a function of causing the communication apparatus to serve as an access point and performing direct wireless communication with the external apparatus via the access point.

9. A communication system including a first communication apparatus and a second communication apparatus, the first communication apparatus having a first communication function and a second communication function, the first communication function being a function of causing the communication apparatus to serve as a wireless client that is connected to an external access point and performs communication via the external access point, the second communication function being a function of performing direct wireless communication with the second communication apparatus,
the first communication apparatus comprising:
at least one memory that stores a set of instructions; and
at least one processor that executes the instructions, the instructions, when executed, causing the first communication apparatus to perform operations comprising:
performing a first determination to, in a case where a use request for using a setting service of externally receiving a setting change regarding the wireless client has been received, determine whether a predetermined type of data communication is being performed using the first communication function or not;
after determining that the predetermined type of the data communication is being performed using the first communication function, transmitting, to the second communication apparatus with which the direct wireless communication has been established, first information that indicates that the setting service is temporarily unavailable;
after determining that the predetermined type of the data communication is not being performed using the first communication function, transmitting, to the second communication apparatus with which the direct wireless communication has been established, second information that indicates that the setting service is available; and
activating, in a case where it is determined that the predetermined type of the data communication is not being performed using the first communication function, the setting service, and
the second communication apparatus comprising:
a display device;
at least one memory that stores a set of instructions; and
at least one processor that executes the instructions, the instructions, when executed, causing the information processing apparatus to perform operations comprising:

controlling to display on the display device, in a case where the first information has been received from the communication apparatus via the direct wireless communication, information indicating that the service cannot be used; and controlling to display on the display device, in a case where the second information has been received from the first communication apparatus via the direct wireless communication, information indicating that the setting service can be used.

10. The communication system according to claim 9, wherein, in a case where the first information has been received from the first communication apparatus to the second communication apparatus, a selection item for activating the setting service is displayed on the display device of the second communication apparatus.

11. An information processing method performed by a communication apparatus having a first communication function and a second communication function, the first communication function being a function of causing the communication apparatus to serve as a wireless client that is connected to an external access point and performs communication via the external access point, the second communication function being a function of performing direct wireless communication with an external apparatus, the information processing method comprising:

performing a first determination to, in a case where a use request for using a setting service of externally receiving a setting change regarding the wireless client has been received, determine whether a predetermined type of data communication is being performed using the first communication function or not;

after determining that the predetermined type of the data communication is being performed using the first communication function, transmitting, to the external apparatus with which the direct wireless communication has been established, first information that indicates that the setting service is temporarily unavailable;

after determining that the predetermined type of the data communication is not being performed using the first communication function, transmitting, to the external apparatus with which the direct wireless communication has been established, second information that indicates that the setting service is available; and activating the setting service in a case where third information indicating activating the setting service is received from the external apparatus after transmitting the first information to the external apparatus, wherein the activated setting service receives connection information from the external apparatus via the direct wireless communication, and the received connection information is used for changing the external access point to which the wireless client is connected.

12. The information processing method according to claim 11, further comprising:

determining whether the predetermined type of the data communication has ended, after determining that the predetermined type of the data communication is being performed using the first communication function; and transmitting, in a case where it is determined the predetermined type of the data communication has ended, the second information to the external apparatus with which the direct wireless communication has been established.

13. The information processing method according to claim 12, further comprising:

activating the setting service, in a case where it is determined that predetermined type of the data communication is being performed; and stopping the setting service, after receiving the connection information.

14. The information processing method according to claim 11, wherein the third information contains information for triggering a disconnection operation of forcibly disconnecting communication regarding the first communication function.

15. The information processing method according to claim 11, further comprising:

changing a setting regarding the first communication function so as to avoid a new connection using the first communication function from being performed, before activation of the setting service.

16. The information processing method according to claim 11, wherein the use request is received via a screen displayed on an operation unit.

17. An information processing method in a communication system including a first communication apparatus and a second communication apparatus, the first communication apparatus having a first communication function and a second communication function, the first communication function being a function of causing the communication apparatus to serve as a wireless client that is connected to an external access point and performs communication via the external access point, the second communication function being a function of performing direct wireless communication with the second communication apparatus, the information processing method comprising:

determining, in a case where a use request for using a setting service of externally receiving a setting change regarding the wireless client has been received, whether a predetermined type of data communication is being performed using the first communication function or not;

transmitting, after determining that the predetermined type of the data communication is being performed using the first communication function, first information indicating that the setting service is temporarily unavailable to the second communication apparatus, and transmitting, after determining that the predetermined type of the data communication is not being performed using the first communication function, second information indicating that the setting service is available to the second communication apparatus;

displaying, in a case where the first information has been received from the first communication apparatus, information indicating that the setting service cannot be used, and displaying, in a case where the second information has been received from the first communication apparatus, information indicating that the setting service can be used; and activating, in a case where it is determined that the predetermined type of the data communication is not being performed using the first communication function, the setting service.

18. The information processing method according to claim 17, wherein the activated setting service receives connection information from the second communication apparatus via the direct wireless communication, and the received connection information is used for changing the external access point to which the wireless client is connected.

* * * * *